United States Patent [19]
Easom

[11] 3,828,459
[45] Aug. 13, 1974

[54] PNEUMATIC RIFLE CAST FISHING ROD

[76] Inventor: Miller Easom, c/o Miller Easom Mail Order, 110-113 Francis L. Blvd., Hollis, N.Y. 11429

[22] Filed: Apr. 17, 1973

[21] Appl. No.: 352,027

[52] U.S. Cl. ............................... 43/19, 124/11 R
[51] Int. Cl. ........................................ A01k 91/02
[58] Field of Search............ 43/19; 124/11 R, 11 A, 124/13 A

[56] References Cited
UNITED STATES PATENTS

| | | | |
|---|---|---|---|
| 997,730 | 7/1911 | Aten | 43/19 |
| 2,671,289 | 3/1954 | McCullough | 43/19 |
| 2,924,211 | 2/1960 | McSwain | 124/11 R |
| 2,977,706 | 4/1961 | Merz | 43/19 |
| 3,419,991 | 1/1969 | Mitchell | 43/19 |
| 3,468,051 | 9/1969 | Duperron | 43/19 |

*Primary Examiner*—Antonio F. Guida
*Assistant Examiner*—Daniel J. Leach
*Attorney, Agent, or Firm*—Carl Miller

[57] ABSTRACT

An improved fishing rod for use by sports fishermen, the rod including a mechanism for casting the baited hook out into the water. The mechanism consists of an inflatable gas pressure can in the rod handle, gas being released by a trigger so that the released air quickly pushes a piston against a rear end of a rod that is slidable in a rifle-like barrel. A forward end of the rod extends from the barrel and has a cup in which is placed a baited hook attached to the fishing line so that when the rod is struck by the piston it thrusts the baited hook out into the water.

1 Claim, 3 Drawing Figures

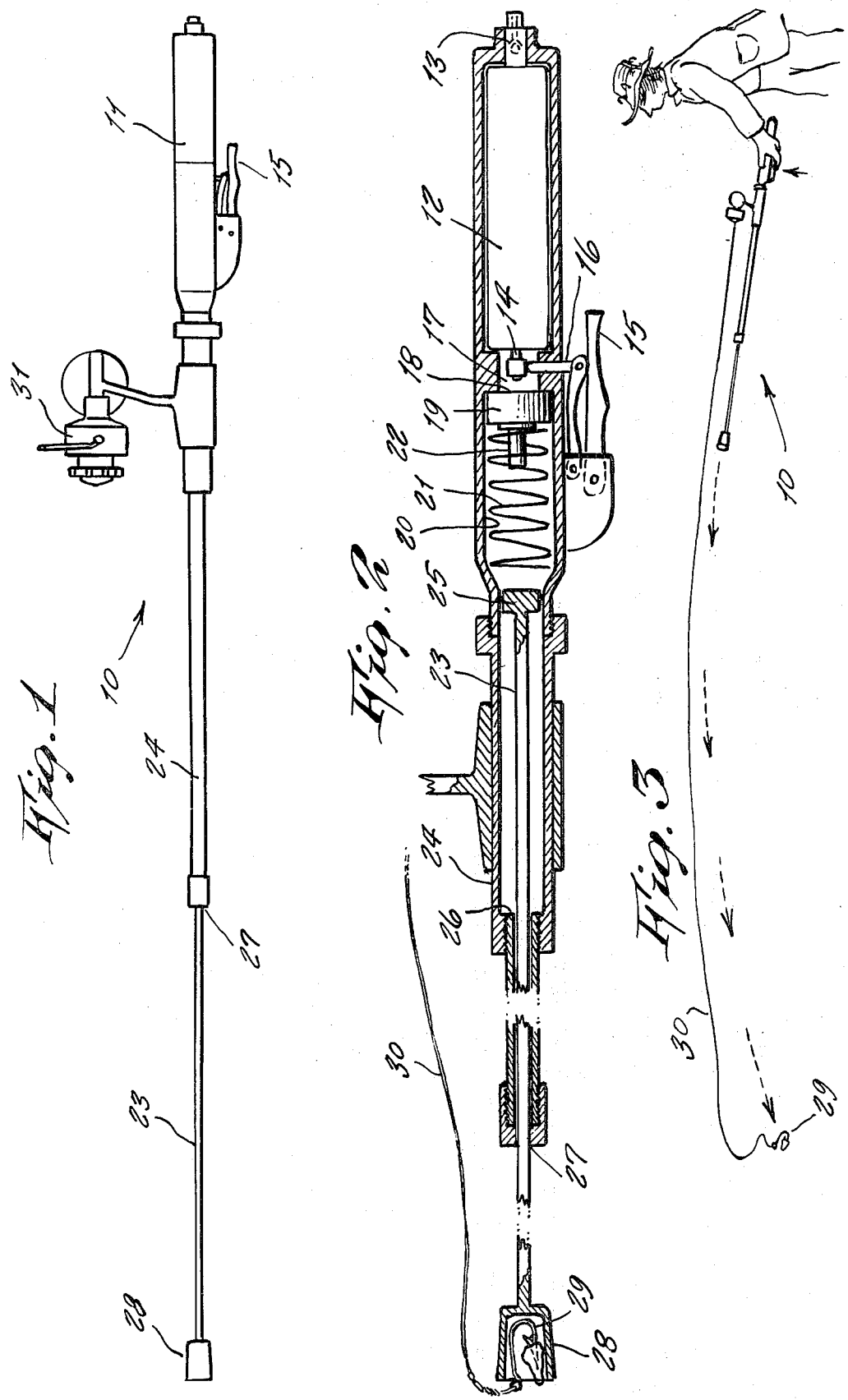

PNEUMATIC RIFLE CAST FISHING ROD

This invention relates generally to fishing rods.

A principle object of the present invention is to provide a fishing rod which includes a mechanism for casting a baited hook out into the water.

Another object is to provide a fishing rod which is of rifle-like character in which an instant violent driving force pushes a slidable rod in a straight line forwardly in a barrel so the front of the rod thrusts the baited hook ahead so through the air.

Another object is to provide a fishing rod which accordingly is ideal for casting in areas where a dense underbrush, bushes and trees do not permit a fisherman to swing a conventional rod in a conventional manner due to the line getting hooked up in the branches, the present invention requiring no swinging but simply requiring only to be pointed in a direction into which casting is desired.

Yet another object is to provide a fishing rod which requires no particular physical skill or strength in order to cast, so that it is ideal for disabled persons or for aged fisherman who cannot move very easily.

Other objects are to provide a pneumatic rifle cast fishing rod which is simple in design, inexpensive to manufacture, rugged in construction, easy to use and efficient in operation.

These and other objects will be readily evident upon a study of the following specification and the accompanying drawing wherein:

FIG. 1 is a side view of the invention.

FIG. 2 is an enlarged cross sectional view thereof taken in the same plane.

FIG. 3 shows the invention in hook casting operation.

Referring now to the drawing in detail the reference numeral 10 represents a pneumatic rifle cast fishing rod according to the present invention wherein there is a handle 11 for being held in a fisherman's hand, the handle being hollow and containing a pressurized canister 12 containing air. A one-way valve 13 at one end allows a person to refill the canister at any automobile service station having a pressurized air hose. THe other end of the canister has a release valve 14 operatable by a finger operated trigger 15 that pushes a pin 16 against the valve stem so to cause it to tilt and release a blast of pressurized air, all of which is well known in pressurized canister release valves. The released air enters a chamber 17 and pushes against rear wall 18 of a piston 19 that is thus forwardly slidable in a cylinder 20 against the action of a weak return spring 21. A pin 22 on a forward side of the piston 19 strikes against a rear end of a rod 23 slidable within a barrel 24, until an enlarged head 25 on the rear end of the rod 23 strikes against a shoulder 26 that stops the rod's forward travel.

A forward end of the rod protrudes from a muzzle opening 27 of the barrel, and the rod forward end has a cup 28 formed thereupon wherein a baited fish hook 29 is placed, the hook being attached to a fishing line 30 extending from a reel 31 mounted upon the rod.

When casting, the fisherman simply depresses the trigger, thus causing the sudden air blast to thrust the piston violently against the rod so that the baited fish hook is shot out of the cup and into the water. All this occurs with the speed of a bullet, and the hook can be cast out up to 60 feet.

Fishing line guides could be incorporated along the barrel. The fisherman now proceed to fish by holding the rod handle in a conventional way.

While various changes may be made in the detail construction, it is understood that such changes will be within the spirit and scope of the present invention as is defined by the appended claim.

What I claim as new and desire to secure by Letters Patent is:

1. In a pneumatic rifle cast fishing rod, the combination of a handle at one end of an elongated barrel, a fishing line reel secured to a side of said barrel, a line extending from said reel, a baited hook on an end of said line, and means whereby said baited hook is cast out into the water, wherein said means includes a pressurized canister of air within said handle, a trigger on a side of said handle to release air from said canister whereby said released air causes a rod in said barrel to be forwardly thrust, wherein a forward end of said rod has a cup within which said baited hook is placed, and wherein a quick blast of said air from said canister causes said baited hook to be cast up to 60 feet away into the water.

* * * * *